March 18, 1924.

W. D. INGRAHAM

ANTISKID DEVICE

Filed May 26, 1923

1,487,163

W. D. Ingraham
INVENTOR

BY Victor J. Evans
ATTORNEY

WITNESS:

Patented Mar. 18, 1924.

1,487,163

UNITED STATES PATENT OFFICE.

WILLIAM D. INGRAHAM, OF NORTH ADAMS, MASSACHUSETTS.

ANTISKID DEVICE.

Application filed May 26, 1923. Serial No. 641,661.

*To all whom it may concern:*

Be it known that I, WILLIAM D. INGRAHAM, a citizen of the United States, residing at North Adams, in the county of Berkshire and State of Massachusetts, have invented new and useful Improvements in Antiskid Devices, of which the following is a specification.

This invention relates to an anti-skid device, the general object of the invention being to provide means for preventing the wheels of a vehicle from spinning in muddy or sandy ground or in snow or on icy roads.

Another object of the invention is to make the device attachable to ordinary anti-skid chains.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
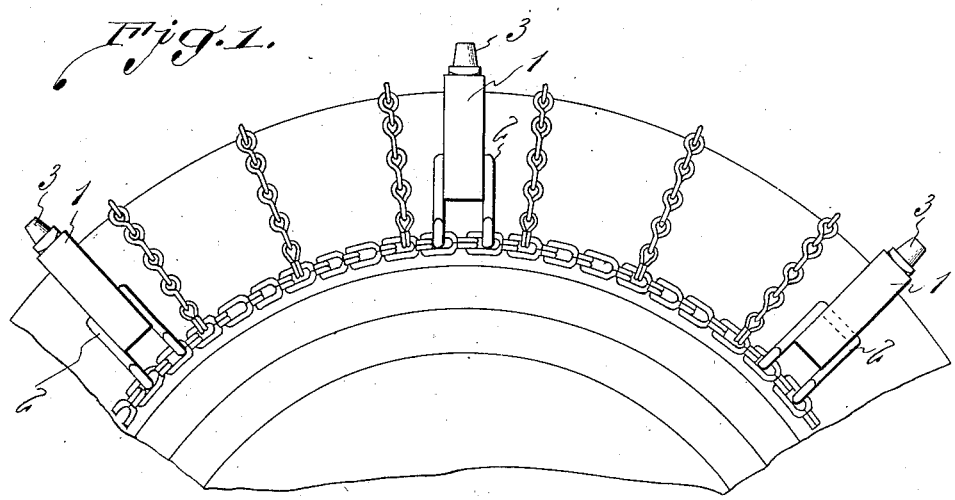
Figure 1 is a fragmentary side view of a wheel showing my invention in position.
Figure 2:
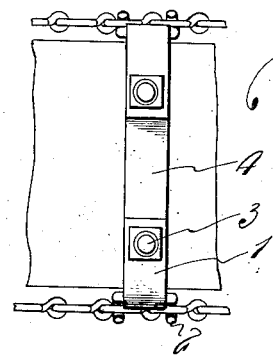
Figure 2 is a fragmentary edge view.
Figure 3:
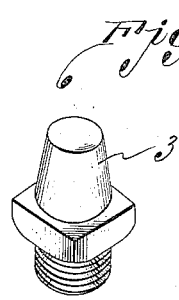
Figures 3 and 4 are detail views of one of the cross pieces.
Figure 4:
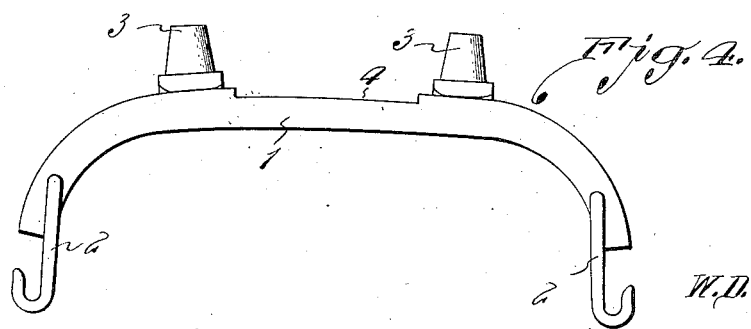

As shown in these views the invention comprises a plurality of curved bars 1 for extending across the tread part of a tire and the hooks 2 for connecting the bars with the side chains of the anti-skid device. Each hook 2 is made in the form of a staple which is threaded through a hole adjacent one end of each bar and the ends of the staple are bent into hook shape. Each bar carries a pair of calks 3 which are preferably threaded in sockets formed in the bar so that the calks can be renewed when worn. The bar is recessed between the calks, as shown at 4 to reduce the weight thereof and also to form shoulders to grip the road surface and help the calks to prevent side skid. While the drawing shows the devices attached to an ordinary anti-skid chain it will of course be understood that they may be attached to simple side chains so that they can be used without the non-skid device.

The devices are mainly designed for use in snow and ice and in sand or mud where the ordinary skid chains are not sufficient to prevent spinning of a wheel. They can be detached when not desired to be used and as many of these bars can be used as desired.

It is thought from the foregoing description that the advantages and novel features of my invention will be readily apparent.

I desire it to be understood that I may make changes in the construction and in the combination and arangement of the several parts, provided that such changes fall within the scope of the appended claim.

What I claim is:—

A device of the class described comprising a curved bar for engaging the tread part of a tire, a recess formed at the center of the outer face of said bar, a threaded socket in the bar on each side of the recess, calks having threaded parts for engaging the sockets, a staple threaded through a hole in the bar at each end thereof and having its ends bent into hook-shape for engaging the side chains of a non-skid device.

In testimony whereof I affix my signature.

WILLIAM D. INGRAHAM.